(12) United States Patent
Woo et al.

(10) Patent No.: US 11,581,520 B2
(45) Date of Patent: Feb. 14, 2023

(54) NOTCHING APPARATUS AND METHOD FOR SECONDARY BATTERY

(71) Applicant: LG Chem, Ltd., Seoul (KR)

(72) Inventors: Sang Jin Woo, Daejeon (KR); Tae Hwan Chung, Daejeon (KR); Sin Young Park, Daejeon (KR); Tae Won Kang, Daejeon (KR); Ji Soo Park, Daejeon (KR); Dong Hyeuk Park, Daejeon (KR); Chang Bum Ahn, Daejeon (KR); Jae Hong Kim, Daejeon (KR)

(73) Assignee: LG Energy Solution, Ltd.

( * ) Notice: Subject to any disclaimer, the term of this patent is extended or adjusted under 35 U.S.C. 154(b) by 730 days.

(21) Appl. No.: 16/604,386

(22) PCT Filed: Dec. 19, 2018

(86) PCT No.: PCT/KR2018/016227
§ 371 (c)(1),
(2) Date: Oct. 10, 2019

(87) PCT Pub. No.: WO2019/143033
PCT Pub. Date: Jul. 25, 2019

(65) Prior Publication Data
US 2020/0161629 A1    May 21, 2020

(30) Foreign Application Priority Data
Jan. 16, 2018 (KR) .......................... 10-2018-0005601

(51) Int. Cl.
*H01M 4/04* (2006.01)
*B26D 3/14* (2006.01)
*F26B 3/30* (2006.01)

(52) U.S. Cl.
CPC ............ *H01M 4/0471* (2013.01); *B26D 3/14* (2013.01); *F26B 3/30* (2013.01)

(58) Field of Classification Search
CPC ........... H01M 4/0471; B26D 5/14; F26B 3/30
(Continued)

(56) References Cited

U.S. PATENT DOCUMENTS 3,952,421 A * 4/1976 Wilson .................... F26B 3/347
34/256
4,550,475 A * 11/1985 Ishigami .............. H03H 9/0514
29/25.35
(Continued)

FOREIGN PATENT DOCUMENTS

CN        201408801 Y     2/2010
CN        202284725 U     6/2012
(Continued)

OTHER PUBLICATIONS

Extended European Search Report including Written Opinion for Application No. EP18900666.1 dated Jun. 17, 2020, 8 pages.
(Continued)

*Primary Examiner* — Stephen M Gravini
(74) *Attorney, Agent, or Firm* — Lerner, David, Littenberg, Krumholz & Mentlik, LLP

(57) ABSTRACT

The present invention relates an electrode notching apparatus. The electrode notching apparatus comprises: a notching unit shaping an electrode into a predetermined pattern; a heating unit drying the electrode processed by the notching unit; and a collecting unit collecting the electrode dried by the heating unit, wherein the heating unit comprises: a heating body having a drying space through which the electrode supplied by the notching unit passes; and heating
(Continued)

members directly heating a surface of the electrode passing through the drying space to dry moisture remaining on the electrode.

14 Claims, 6 Drawing Sheets

(58) Field of Classification Search
USPC .......................................................... 29/623.1
See application file for complete search history.

(56) References Cited

U.S. PATENT DOCUMENTS

| | | | | |
|---|---|---|---|---|
| 4,654,979 | A * | 4/1987 | Candor | F26B 23/00 |
| | | | | 34/254 |
| H923 | H * | 6/1991 | Carlon | D06F 58/26 |
| | | | | 34/254 |
| 6,053,953 | A * | 4/2000 | Tomiyama | H01M 10/0525 |
| | | | | 429/231.95 |
| 6,159,253 | A * | 12/2000 | Lund | H01M 10/0431 |
| | | | | 429/136 |
| 6,192,599 | B1 * | 2/2001 | Bryant | F26B 13/10 |
| | | | | 34/400 |
| 6,371,995 | B1 * | 4/2002 | Yasunami | H01M 10/0587 |
| | | | | 429/324 |
| 7,498,625 | B2 * | 3/2009 | Takamatsu | H01L 27/11502 |
| | | | | 257/295 |
| 7,998,822 | B2 * | 8/2011 | Jawarani | H01L 21/2855 |
| | | | | 438/303 |
| 2002/0029465 | A1 * | 3/2002 | Shida | H01M 6/40 |
| | | | | 29/623.5 |
| 2004/0256982 | A1 * | 12/2004 | Nagayama | H01L 27/3288 |
| | | | | 313/506 |
| 2007/0196576 | A1 | 8/2007 | Kim et al. | |
| 2008/0056692 | A1 * | 3/2008 | Yeh | A45D 20/40 |
| | | | | 392/407 |
| 2009/0273647 | A1 * | 11/2009 | Kwon | B41J 2/1631 |
| | | | | 29/890.1 |
| 2010/0058609 | A1 * | 3/2010 | Taguchi | F26B 13/10 |
| | | | | 34/443 |
| 2012/0043639 | A1 * | 2/2012 | Li | H01L 21/486 |
| | | | | 257/E21.546 |
| 2012/0055628 | A1 | 3/2012 | Min et al. | |
| 2012/0117815 | A1 * | 5/2012 | Wechsler | C10B 47/44 |
| | | | | 34/562 |
| 2012/0251858 | A1 * | 10/2012 | Kato | H01M 50/124 |
| | | | | 361/518 |
| 2014/0101956 | A1 * | 4/2014 | Priebe | B41J 11/00216 |
| | | | | 34/60 |
| 2015/0226479 | A1 * | 8/2015 | Fujita | H05B 3/44 |
| | | | | 34/266 |
| 2016/0006017 | A1 | 1/2016 | Momma et al. | |
| 2017/0005318 | A1 * | 1/2017 | Otohata | H01M 50/54 |
| 2017/0365842 | A1 | 12/2017 | Hoshina et al. | |
| 2019/0267607 | A1 | 8/2019 | Momma et al. | |
| 2020/0152962 | A1 * | 5/2020 | Woo | F26B 3/30 |
| 2020/0161629 | A1 * | 5/2020 | Woo | H01M 10/0404 |
| 2022/0045309 | A1 * | 2/2022 | Min | B05C 1/083 |

FOREIGN PATENT DOCUMENTS

| | | | |
|---|---|---|---|
| CN | 102544434 A | 7/2012 | |
| CN | 102592835 A | 7/2012 | |
| CN | 102824984 A | 12/2012 | |
| CN | 103378350 A | 10/2013 | |
| CN | 106099046 A | 11/2016 | |
| EP | 3641023 A1 * | 4/2020 | B21D 28/02 |
| JP | 2002318071 A | 10/2002 | |
| JP | 2003132878 A | 5/2003 | |
| JP | 2004355967 A | 12/2004 | |
| JP | 2011134545 A | 7/2011 | |
| JP | 2011216228 A | 10/2011 | |
| JP | 2012146851 A | 8/2012 | |
| JP | 5249916 B2 | 7/2013 | |
| JP | 2014060095 A | 4/2014 | |
| JP | 5509998 B2 | 6/2014 | |
| JP | 2014107237 A | 6/2014 | |
| JP | 2016027562 A | 2/2016 | |
| JP | WO2014073289 A1 * | 9/2016 | |
| KR | 20000031096 A | 6/2000 | |
| KR | 100280718 B1 | 3/2001 | |
| KR | 20070083363 A | 8/2007 | |
| KR | 101077069 B1 | 10/2011 | |
| KR | 20120020223 A | 3/2012 | |
| KR | 20120076850 A | 7/2012 | |
| KR | 20130022304 A | 3/2013 | |
| KR | 20130089078 A | 8/2013 | |
| KR | 20150062839 A | 6/2015 | |
| KR | 101561622 B1 | 10/2015 | |
| KR | 101572720 B1 | 11/2015 | |
| KR | 20160095765 A | 8/2016 | |
| KR | 20160114857 A | 10/2016 | |
| WO | WO-2007136005 A1 * | 11/2007 | B41C 1/1083 |
| WO | WO-2014073289 A1 * | 5/2014 | F26B 13/10 |
| WO | WO-2019225828 A1 * | 11/2019 | B21D 28/02 |
| WO | 20190133530 A * | 12/2019 | |

OTHER PUBLICATIONS

International Search Report for Application No. PCT/KR2018/016227, dated May 30, 2019, pp. 1-2.
Search Report dated Jun. 22, 2022 from Office Action for Chinese Application No. 201880045589.3 dated Jun. 29, 2022. 4 pgs.

* cited by examiner

NOTCHING APPARATUS AND METHOD FOR SECONDARY BATTERY

CROSS-REFERENCE TO RELATED APPLICATION

This application is a national phase entry under 35 U.S.C. § 371 of International Application No. PCT/KR2018/016227, filed Dec. 19, 2018, which claims priority from Korean Patent Application No. 10-2018-0005601, filed on Jan. 16, 2018, which are hereby incorporated by reference in their entirety.

TECHNICAL FIELD

The present invention relates to a notching apparatus and method for a secondary battery, and more particularly, to a notching apparatus and method for a secondary battery, in which an electrode notched to match an electrode pattern is directly heated to quickly dry moisture remaining on a surface of the electrode.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery comprises an electrode assembly in which electrodes and separators are alternately stacked and a case accommodating the electrode assembly, and the electrode assembly has a structure in which the plurality of electrodes and the plurality of separators are alternately stacked.

Also, a method for manufacturing the secondary battery comprises a process of manufacturing an electrode, a process of stacking the manufactured electrode and a separator to manufacture an electrode assembly, and a process of accommodating the manufactured electrode assembly in a case to manufacture the secondary battery.

Here, the electrode manufacturing process further comprises a notching process of notching the electrode. In the notching process, a processing process of shaping the electrode into an electrode pattern and a drying process of drying moisture remaining on a surface of the shaped electrode are performed. In the drying process, an electrode active material applied to a collector of the electrode is dried by using hot air to evaporate the moisture.

However, since the drying process uses the hot air, it takes a long time to dray the electrode active material applied to the collector. Thus, the electrode may be significantly deteriorated in productivity. Particularly, the notching process has a problem in that the processing process and the drying process are separately performed to significantly deteriorate work efficiency.

DISCLOSURE OF THE INVENTION

Technical Problem

The present invention has been made to solve the above problems, an object of the present invention is to provide a notching apparatus and method for a secondary battery, in which a shaped electrode is directly heated to quickly dry moisture remaining on a surface of the electrode so as to significantly reduce a drying time, and particularly, a process of notching the electrode and a process of drying the electrode are combined with each other to significantly improve work efficiency.

Technical Solution

To achieve the above object, a notching apparatus for a secondary battery according to a first embodiment of the present invention comprises: a notching unit shaping an electrode into a predetermined pattern; a heating unit drying the electrode processed by the notching unit; and a collecting unit collecting the electrode dried by the heating unit, wherein the heating unit comprises: a heating body having a drying space through which the electrode supplied by the notching unit passes; and heating members directly heating a surface of the electrode passing through the drying space to dry moisture remaining on the electrode.

Each of the heating members may comprise: a mounting part provided in the drying space; and a plurality of heating lamps installed on the mounting part and disposed close to the surface of the electrode to directly heat the surface of the electrode so as to dry the moisture remaining on the electrode.

The mounting part may comprise: a fixed plate provided in the drying space; and a guide plate which is slidably coupled to the fixed plate and on which the plurality of heating lamps are installed.

The heating body may comprise: an inlet which is provided in a left surface of the heating body and through which the electrode supplied from the notching unit is introduced; an outlet which is provided in a right surface of the heating body and through which the electrode introduced into the drying space is discharged; and a cover coupled to one surface between the inlet and the outlet, wherein the guide plate is coupled to the fixed plate so as to be slid in a direction of the cover.

The heating unit may further comprise a transfer roller transferring the electrode introduced into the drying space, wherein the transfer roller may comprise: a first transfer roller disposed at an inlet-side of the drying space; a second transfer roller disposed on an upper portion of the left surface of the drying space; a third transfer roller disposed on an upper portion of the right surface of the drying space; and a fourth transfer roller disposed at an outlet-side of the drying space, the heating members may be respectively provided between the first transfer roller and the second transfer roller, between the second transfer roller and the third transfer roller, and between the third transfer roller and the fourth transfer roller, and the electrode introduced into the drying space may be dried by the heating members while being transferred along the first to fourth transfer rollers.

The heating members may be respectively provided to correspond to both surfaces of the electrode so as to dry both the surfaces of the electrode at the same time.

The heating member drying one surface of the electrode, which faces a wall of the drying space, may be installed on the wall of the drying space, and the heating member drying the other surface of the electrode may be installed on an auxiliary frame provided in the drying space.

The heating lamp may be spaced a distance of 2 mm to 10 mm from the surface of the electrode.

The heating unit may further comprise an exhaust member discharging air containing the moisture within the drying space to the outside.

The exhaust member may be disposed on an outer surface of the heating body.

The exhaust member may comprise: an exhaust duct disposed on the outer surface of the heating body to discharge the air within the drying space to the outside; and an exhaust pump generating suction force to forcibly discharge the air within the drying space to the outside through the exhaust duct.

The heating lamp may comprise a far-infrared lamp or a xenon light.

A notching method for a secondary battery by using the notching apparatus for the secondary battery according to a second embodiment of the present invention comprises: a notching step (S10) of shaping an electrode into a predetermined electrode pattern through a notching unit; a drying step (S20) of directly heating a surface of the electrode processed in the notching step by using a heating unit to dry moisture remaining on the electrode; and a collecting step (S30) of collecting the electrode dried in the drying step into a collecting unit, wherein the heating unit comprises: a heating body having a drying space through which the electrode supplied in the notching step (S10) passes; and a heating member directly heating the surface of the electrode passing through the drying space to dry the moisture remaining on the electrode.

Advantageous Effects

1. The notching apparatus for the secondary battery according to the present invention may comprise the notching unit, the heating unit, and the collecting unit. The heating unit may comprise the heating body and the heating member. Thus, the surface of the notched electrode may be directly heated to quickly dry the moisture remaining on the electrode. As a result, the working time may be significantly reduced to significantly improve the productivity. Particularly, the process of notching the electrode and the process of drying the electrode may be combined with each other to significantly improve the work efficiency.

2. The heating member according to the present invention may comprise the mounting part and the plurality of heating lamps. Thus, the surface of the electrode may be directly heated by using the heat emitted from the plurality of heating lamps to more quickly dry the moisture remaining on the electrode.

3. The mounting part according to the present invention may comprise the fixed plate and the guide plate which is slidably coupled to the fixed plate and on which the plurality of heating lamps are installed. Thus, the guide plate may be taken out of the heating body to easily replace the plurality of heating lamps, thereby improving the work efficiency.

4. The heating body according to the present invention may comprise the inlet through which the electrode is introduced, the outlet through which the electrode is discharged, and the cover. Thus, the heating unit mounted inside the heating body may be taken out of the heating body so as to be easily repaired. Particularly, the guide plate may be slid toward the cover to more easily replace the plurality of heating lamps installed on the guide plate.

5. The present invention may comprise the transfer roller transferring the electrode introduced into the heating body. Thus, the electrode may be stably guided from the inlet to the outlet of the heating body. As a result, the heating member may stably directly heat the surface of the electrode.

6. The transfer roller according to the present invention may comprise the first to fourth transfer rollers respectively installed at the vertexes of the heating body. Thus, the electrode introduced into the heating body may be maximally circulated to increase in residence time, thereby significantly improving the drying rate of the electrode.

7. The heating units according to the present invention may be respectively installed between the first and second transfer rollers, between the second and third transfer rollers, and between the third and fourth transfer rollers. Thus, the electrode transferred along the first to fourth transfer rollers may be effectively dried to significantly improve the drying rate of the electrode.

8. The heating unit according to the present invention may be provided on each of both the surfaces of the electrode. Thus, both the surfaces of the electrode may be dried at the same time to improve the work efficiency and reduce the working time.

9. The heating body according to the present invention may comprise the auxiliary frame for installing the heating member. Thus, the heating member that is not capable of being installed on the wall of the heating body may be stably installed.

10. The heating unit according to the present invention may comprise the exhaust member discharging the air within the heating body to the outside. Thus, the air containing the moisture within the heating body may be discharged to the outside to significantly increase in drying rate of the electrode.

11. The exhaust member according to the present invention may be provided on the outer surface of the heating body. Thus, the droplets may be prevented being generated on the boundary line between the heating body and the exhaust member.

12. The exhaust member according to the present invention may comprise the exhaust duct and the exhaust pump. Thus, the air within the heating body may be more quickly discharged to the outside.

13. The heating lamp according to the present invention may comprise the far-infrared lamp or the xenon light. The far-infrared lamp may be the infrared rays having the wavelength of 25 μm or more, which is longer than that of the visible light, and thus may be invisible through the eye, have the large heat effect, and have the high penetration property to realize the good drying efficiency. Also, the xenon light may be brighter than the filament and also may emit light from the bulb, but from the filament, to more widely and quickly dry the surface of the electrode. Particularly, the xenon light may have the lifespan longer than that of the filament to greatly reduce the maintenance cost.

MODE FOR CARRYING OUT THE INVENTION

Figure 1:
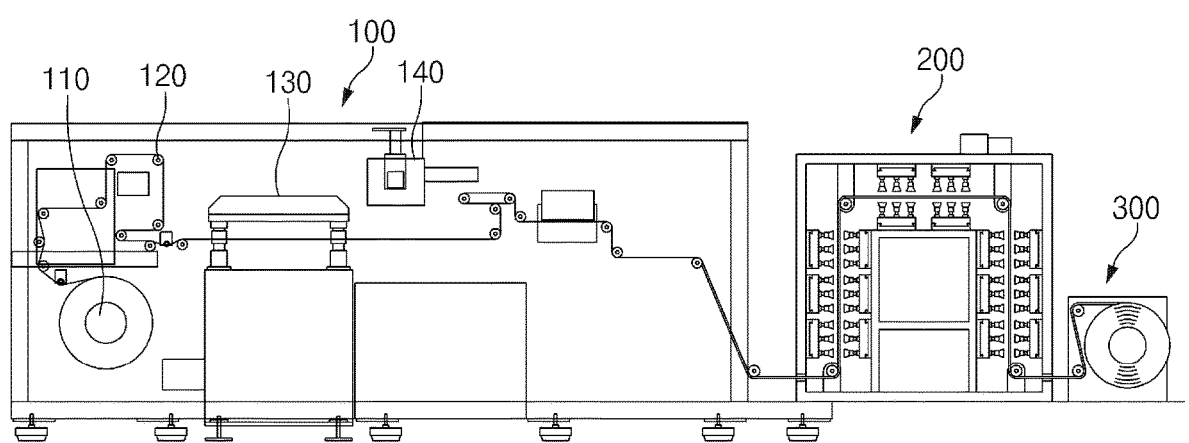
FIG. 1 is a perspective view of a notching apparatus for a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode]

An electrode 10 according to the present invention comprises a collector and an electrode active material applied to one surface or both surfaces of the collector. That is, the electrode 10 may be manufactured by applying the electrode active material to the one surface or both the surfaces of the collector.

A notching process of shaping the electrode into a predetermined electrode pattern is performed on the electrode manufactured as described above. Here, a notching apparatus for the secondary battery is used.

Particularly, in the notching apparatus for the secondary battery, the electrode may be shaped into the predetermined pattern, and the shaped electrode may be dried to significantly improve work efficiency.

[Notching Apparatus for Secondary Battery]

That is, as illustrated in FIG. 1, a notching apparatus for a secondary battery according to a first embodiment of the present invention comprises a notching unit 100 shaping an electrode 10 into a predetermined electrode pattern, a heating unit 200 drying the electrode processed by the notching unit 100, and a collecting unit 300 collecting the electrode 20 dried by the heating unit 200.

Notching Unit

Referring to FIG. 1, the notching unit 100 comprises an unwinding part 110 around which a non-process film is wound in a roll shape, a film feeding part 120 grasping the electrode film unwound from the unwinding part 110 to continuously repeatedly transfer the electrode by a predetermined distance in a horizontal direction, a notching processing part 130 disposed between the unwinding part 110 and the film feeding part 120 to shape the electrode film transferred by the film feeding part 120 into a predetermined electrode pattern so as to form an electrode, and a vision inspection part 140 disposed on the other side of the film feeding part 120 to photograph an electrode part of the shaped electrode so as to inspect the electrode.

Heating Unit

Figure 2:
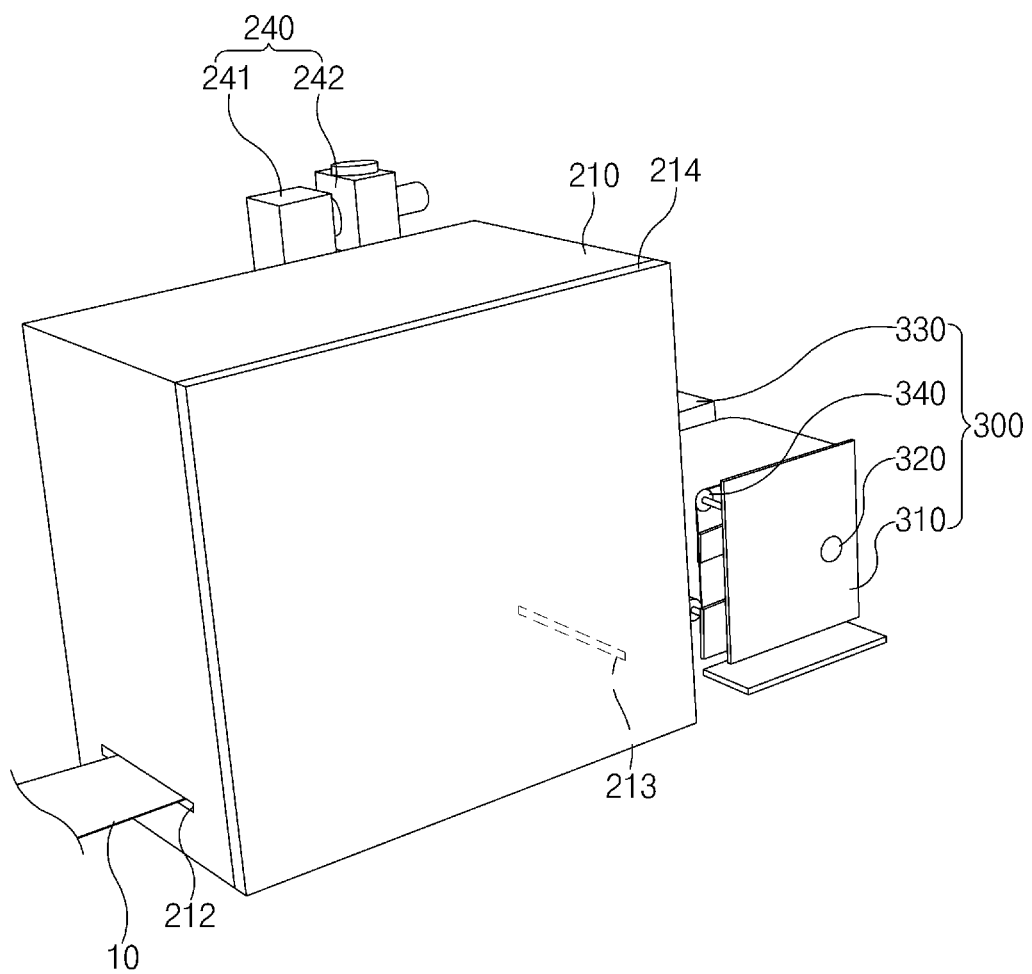
FIG. 2 is a perspective view of a heating unit provided in the notching apparatus for the secondary battery according to the first embodiment of the present invention.
Figure 3:
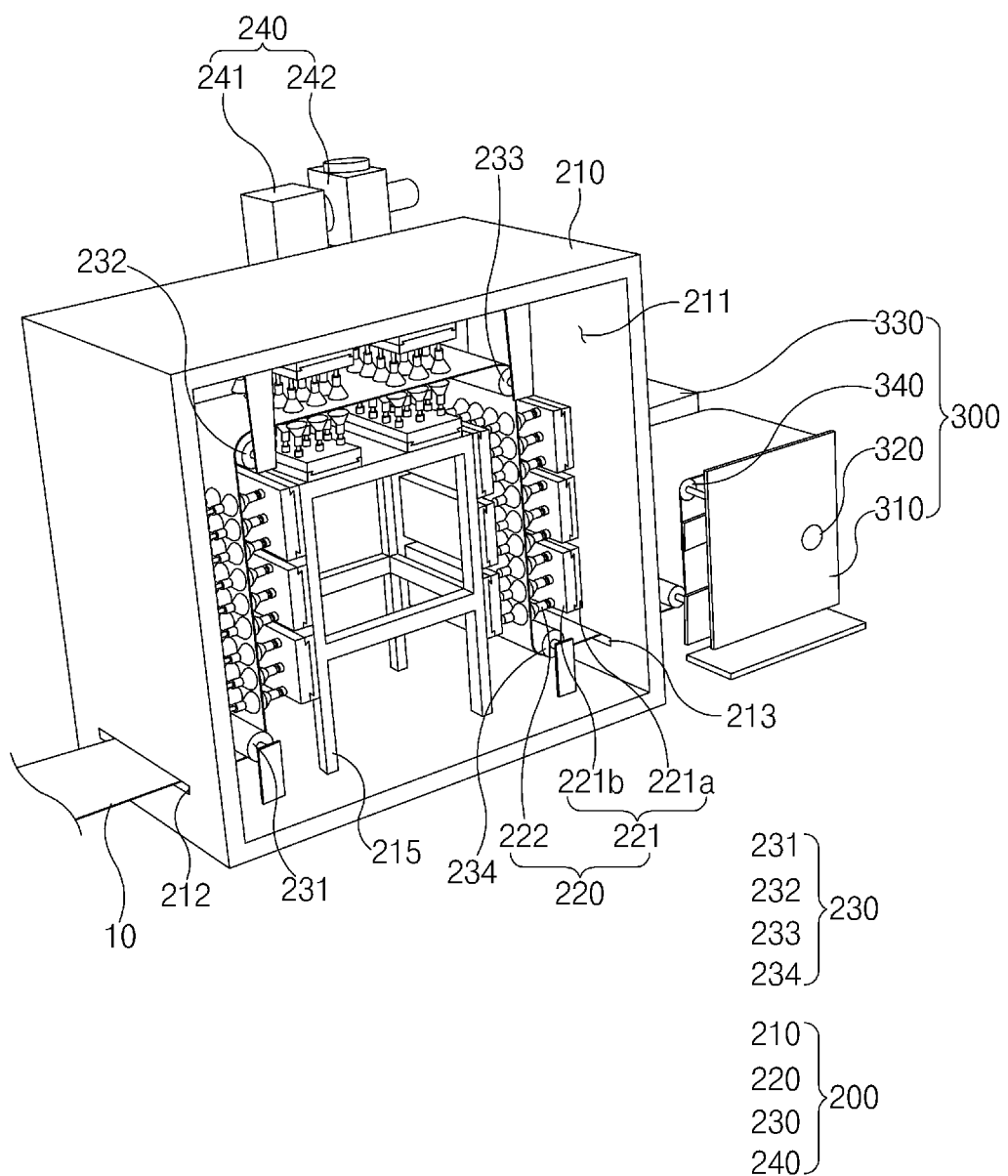
FIG. 3 is a partial exploded perspective view of the heating unit provided in the notching apparatus for the secondary battery according to the first embodiment of the present invention.

As illustrated in FIGS. 2 and 3, the heating unit 200 is configured to quickly dry the moisture remaining on the electrode 10 passing through the notching unit 100 and comprises a heating body 210 through which the electrode 10 supplied from the notching unit 100 passes and a heating member 220 directly heating the surface of the electrode 10 passing through the heating body 210 to dry the moisture remaining on the electrode 10.

The heating body 210 has a rectangular box shape and comprises a drying space 211 through which the electrode 10 supplied from the notching unit 100 passes, an inlet 212 which is provided in a left surface (a left surface of the heating body when viewed in FIG. 1) and through which the electrode 10 supplied from the notching unit 100 is introduced, an outlet 213 which is provided in a right surface (a right surface of the heating body when viewed in FIG. 1) and through which the electrode 10 introduced into the drying space 211 is discharged, and a cover 214 coupled to one surface (a front surface of the heating body when viewed in FIG. 1) between the inlet 212 and the outlet 213. Here, the cover 214 may be separated from the heating body 21 to open the drying space 211 so that the drying space 211 communicates with the outside.

In the heating body 210 having the above-described structure, the electrode 10 is introduced into the drying space 211 through the inlet 212, and then, the electrode 10 introduced into the drying space 211 is discharged through the outlet 213. Here, the cover 214 may be attached and detached to open and close the drying space 211.

The cover 214 may be made of a transparent or translucent heat-resistant material. Thus, the drying space 211 may be easily recognized from the outside.

The heating member 220 may be configured to directly dry the electrode introduced into the drying space 211 of the heating body. The heating member 220 comprises a mounting part 221 provided in the drying space 211 and a plurality of heating lamps 222 installed in the mounting part 221 and disposed close to the surface of the electrode 10 to directly heat and dry the surface of the electrode 10 and thereby to remove the moisture remaining on the electrode 10.

The mounting part 221 may have a structure in which the plurality of heating lamps 222 provided in the drying space 211 are more easily replaced. For example, the mounting part 221 comprises a fixed plate 221*a* provided in the drying space 211 and a guide plate 221*b* which is slidably coupled to the fixed plate 221*a* and on which the plurality of heating lamps 222 are installed. That is, referring to FIGS. 4 and 5, a guide groove 221*a*-1 is formed in the fixed plate 221*a*, and a guide protrusion 221*b*-1 slidably coupled to the guide groove 221*a*-1 is formed on the guide plate 221*b*.

Thus, in the mounting part 221, the guide plate 221*b* may be easily taken out of the drying space 211 by the guide groove 221*a*-1 and the guide protrusion 221*b*-1. As a result, the plurality of heating lamps 222 installed on the guide plate 221*b* may be easily replaced outside the drying space 211 to facilitate maintenance.

Here, the guide plate 221*b* may be coupled to the fixed plate 221*a* so as to be slid toward the cover 214. Thus, the plurality of heating lamps 222 installed on the guide plate 221*b* may be taken out of the drying space 211 only by the small movement of the guide plate 221*b*.

In the mounting part 221, when the plurality of heating lamps 222 provided on the guide plate 221*b* and the surface of the electrode 10 do not match each other, the guide plate 221*b* may be slid along the guide groove 221*a*-1 of the fixed plate 221*a* to allow the plurality of heating lamps 222 and the surface of the electrode 10 to match each other.

The guide plate 221*b* may be detachably coupled to the fixed plate 221*a*. That is, when the plurality of heating lamps 222 are replaced, the replacement of the plurality of heating lamps 222 is performed outside the drying space 211 after the guide plate 221*b* is detached from the fixed plate 221*a*. Then, when the replacement of the heating lamps 222 is completed, the guide plate 221*b* is coupled again to the fixed plate 221*a*.

Each of the fixed plate 221*a* and the guide plate 221*b* of the mounting part 211 may be a heatsink plate which absorbs heat generated in the plurality of heating lamps 222 to release the heat to the outside. Thus, an increase in temperature of the heating lamps 222 may be suppressed.

Figure 4:
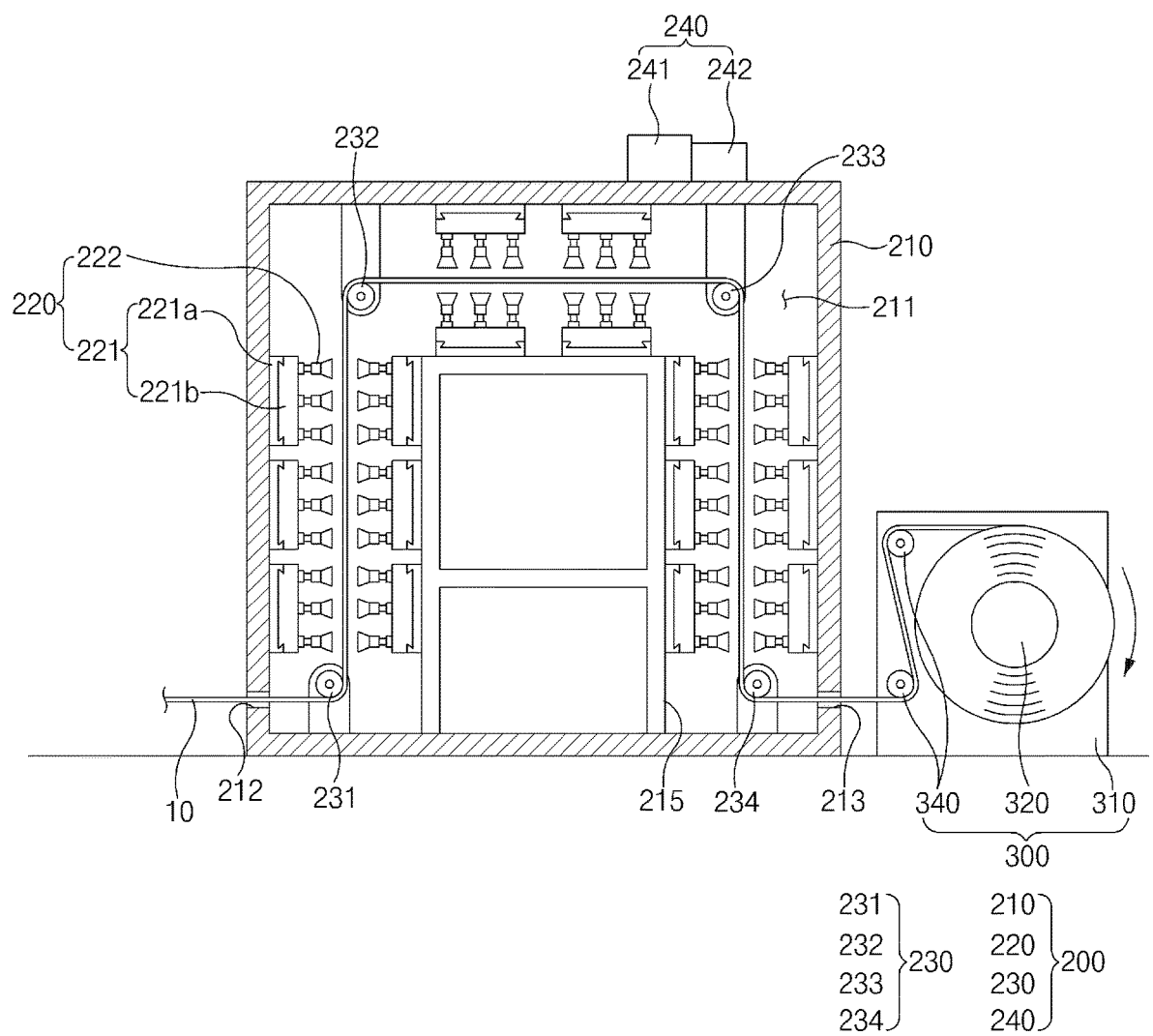
FIG. 4 is a cross-sectional view of the heating unit provided in the notching apparatus for the secondary battery according to the first embodiment of the present invention.
Figure 5:
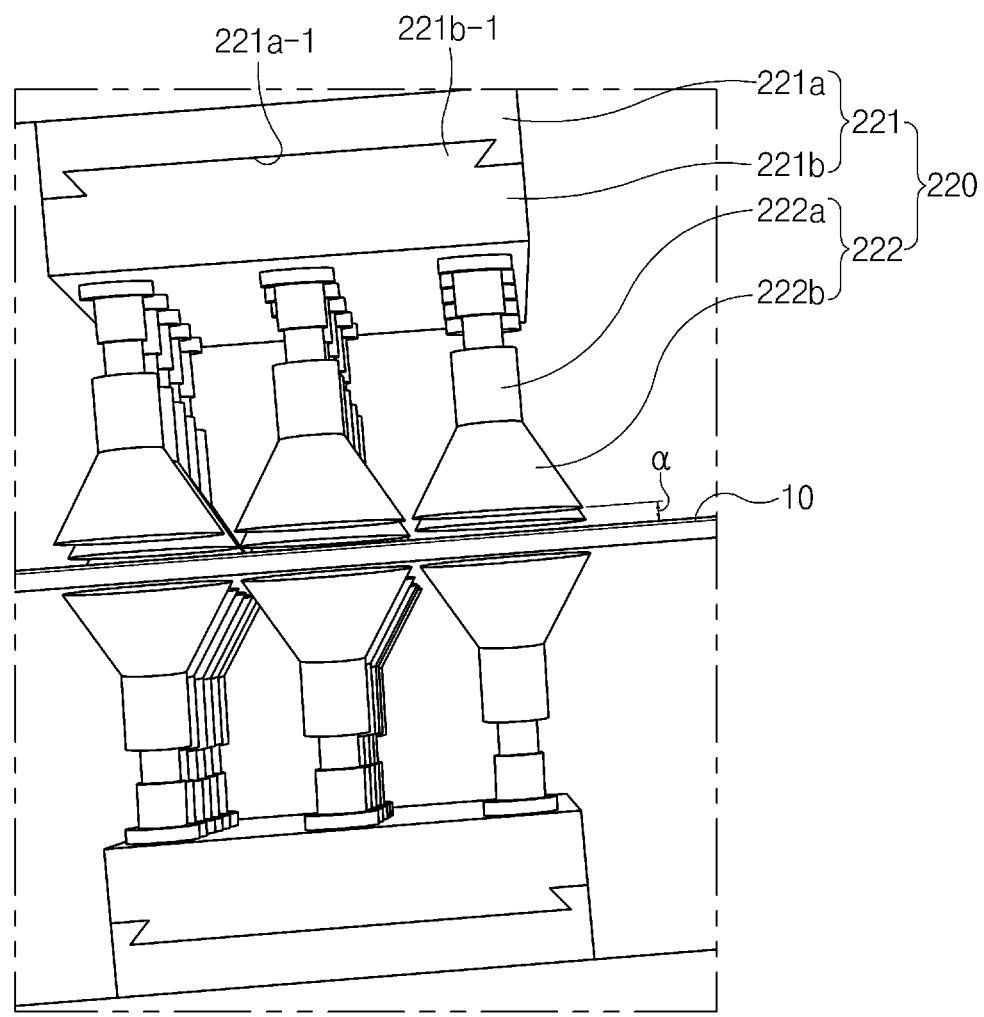
FIG. 5 is a partial enlarged view of the heating unit provided in the notching apparatus for the secondary battery according to the first embodiment of the present invention.

As illustrated in FIGS. 4 and 5, each of the heating lamps 222 comprises a power source part 222a installed on the guide plate 221b to receive current from the outside and a light source part 222b emitting light by the current supplied from the power source part 222a.

Here, the light source part 222b may be disposed close to the surface of the electrode 10. For example, the light source part 222b may be disposed to be spaced a distance 'α', which is illustrated in FIG. 4, from the surface of the electrode 10. That is, the light source part 222b may be disposed a distance of 2 mm to 10 mm from the surface of the electrode 10. That is, when the light source part 222b is spaced a distance of 2 mm or less from the surface of the electrode 10, the electrode 10 may be damaged due to friction between the light source part 222b and the electrode 10. When the light source part 222b is spaced a distance of 10 mm or more from the surface of the electrode 10, the light emitted from the light source part 222b is irradiated onto the surface of the electrode 10 in a diffused state to deteriorate a drying rate of the electrode 10.

Thus, the heating lamp 222 may be disposed to be spaced a distance of 2 mm to 10 mm from the surface of the electrode 10 to stably dry the electrode 10 and thereby to remove the moisture remaining on the electrode 10 without damaging the electrode 10.

The heating lamp 222 may be a far-infrared lamp or a xenon light. That is, the far-infrared lamp may emit an infrared ray having a wavelength of 25 μm or more, which is longer than that of the visible light and thus may be invisible through the eye, have the large heat effect, and have the high penetration property to realize the good drying efficiency. Also, the xenon light may be brighter than the filament and also may emit light from the bulb, but from the filament, to more widely and quickly dry the surface of the electrode. Particularly, the xenon light may have the lifespan longer than that of the filament to greatly reduce the maintenance cost.

The plurality of heating lamps 222 may be regularly or irregularly installed on the guide plate 221b. Particularly, a distance between the plurality of heating lamps 222, which are regularly or irregularly installed on the guide plate 221b, may be a distance in which portions of the light irradiated onto the electrode 10 overlap each other. Thus, the entire surface of the electrode 10 may be directly heated and dried.

The heating unit 200 may further comprise a transfer roller transferring the electrode introduced into the drying space 211 and constantly maintaining tension force.

Particularly, the transfer roller 230 may have a structure in which the electrode 10 introduced into the drying space 211 is circulated with a maximally long length. The heating member 220 may directly heat the electrode 10 transferred along the transfer roller 230 to more effectively remove the moisture remaining on the electrode 10.

For example, the transfer roller 230 comprises a first transfer roller 231 disposed on a side of the inlet 212 of the drying space 211, a second transfer roller 232 disposed on an upper portion of the left surface of the drying space 211, a third transfer roller 233 disposed on an upper portion of the right surface of the drying space 211, and a fourth transfer roller 234 disposed on a side of the outlet 213 of the drying space 211.

Here, the inlet 212 is disposed on a lower end of the left surface of the drying space 211, and the outlet 213 is disposed on a lower end of the right surface of the drying space 211.

Thus, the transfer roller 230 may transfer the electrode introduced into the drying space 211 along the left surface, a top surface, and the right surface of the drying space. As a result, a length and a residence time of the electrode introduced into the drying space 211 may increase, and thus, a drying time through the heating member 220 may naturally increase.

The heating member 220 may be provided between the first transfer roller 231 and the second transfer roller 232, between the second transfer roller 232 and the third transfer roller 233, and between the third transfer roller 233 and the fourth transfer roller 234. Thus, the electrode 10 transferred along the first to fourth transfer rollers 231, 232, 233, and 234 may be directly heated and dried for a long time through the heating member 220 to completely dry the moisture remaining on the electrode 10.

The heating member 220 may dry both surfaces of the electrode 10 at the same time so that the heating rate of the electrode 10 increases. That is, the heating member 220 may be disposed to correspond to both the surfaces of the electrode 10 to dry both the surfaces of the electrode 10 at the same time.

Here, the heating member 220 drying one surface (an outer surface of the electrode when viewed in FIG. 3) of the electrode 10, which faces the wall of the drying space 211, may be installed on the wall of the drying space 211. The heating member 220 drying the other surface (an inner surface of the electrode when viewed in FIG. 3) of the electrode 10 may be installed on an auxiliary frame 215 provided in the drying space 211. Thus, all the heating members 220 provided in the drying space 211 may be stably installed.

The heating unit 200 may further comprise an exhaust member 240 discharging air containing the moisture in the drying space 211 to the outside. The heating unit 200 may quickly discharge the moisture evaporated from the surface of the electrode 10 through the exhaust member 240 to increase in drying rate of the electrode 10.

Particularly, the exhaust member 240 is disposed on the outer surface of the heating body 210, more preferably, an upper portion of a rear surface of the heating body 210 when viewed in FIG. 2. That is, when the exhaust member 240 is disposed on the top surface of the heating body 210, hot air in the drying space 211 and cold air outside the exhaust member 240 may contact each other to generate droplets on a boundary line between the heating body 210 and the exhaust member 240. To prevent this phenomenon, the exhaust member 240 may be installed on the upper portion of the rear surface of the heating body 210 so that the hot air in the drying space 211 is bypassed to a lower portion of the drying space 211 to decrease in temperature and then is discharged to prevent the droplets from being generated on the boundary line between the heating body 210 and the exhaust member 240.

As described above, the exhaust member 240 comprises an exhaust duct 241 disposed on the outer surface of the heating body 210 to discharge the air within the drying space 211 to the outside and an exhaust pump 242 generating suction force to forcibly discharge the air within the drying space 211 to the outside through the exhaust duct 241. Thus, the air containing the moisture within the drying space 211 may be more quickly forcibly discharged to the outside, and thus, the drying rate may increase.

Collecting Unit

Referring to FIGS. 1 and 2, the collecting unit 300 is configured to collect the dried electrode 10 dried by the heating unit 200 and comprises a collecting body 310 comprising a bottom plate and a support plate disposed to correspond to each of both sides of the bottom plate, a collecting roller 320 rotatably disposed between the support plates of the collecting roller 310 to wind and collect the electrode 10 discharged from the heating unit 200, a collecting motor 330 rotating the collecting roller 320 to wind the electrode 10, and a collecting guide roller 340 guiding the electrode 10 collected from the collecting roller 320 and adjusting tension force.

The collecting unit 300 may stably collect the electrode 10 discharged from the heating unit 200 while maintaining the tension force.

In the electrode drying system for the secondary battery comprising the above-described constituents according to the first embodiment of the present invention, the surface of the electrode may be directly heated and dried to more quickly dry the moisture remaining on the electrode, thereby reducing the drying time and improving the productivity.

Hereinafter, a notching method using the electrode notching apparatus according to the first embodiment of the present invention will be described.

[Notching Method for Secondary Battery]

Figure 6:
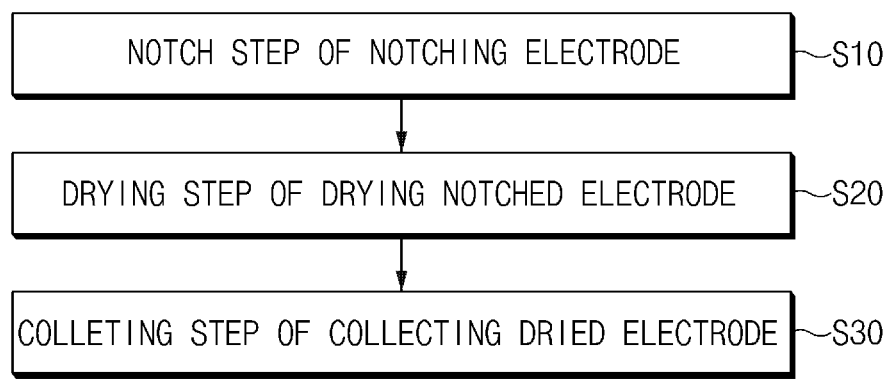
FIG. 6 is a flowchart illustrating a notching method for a secondary battery according to a second embodiment of the present invention.

As illustrated in FIG. 6, a notching method for a secondary battery according to a second embodiment of the present invention comprises: a notching step (S10) of shaping an electrode into a predetermined electrode pattern through a notching unit; a drying step (S20) of directly heating a surface of the electrode processed in the notching step by using a heating unit to dry moisture remaining on the electrode; and a collecting step (S30) of collecting the electrode dried in the drying step into a collecting unit.

In the notching step (S10), a non-processed electrode film wound in a roll shape is supplied through a unwinding part, the non-processed electrode film supplied from the unwinding part is horizontally transferred by a predetermined distance through a film feeding part, the notching processing part shapes the non-processed electrode film, which is horizontally transferred by the film feeding part, into the predetermined electrode pattern to form an electrode, and whether the shaped electrode is defective is inspected through a vision inspection part.

In the drying step (S20), the electrode, on which the notching step (S10) is performed, is introduced into a drying space 211 through an inlet 212 formed in a heating body 210, and the electrode 10 introduced into the drying space 211 is transferred along first to fourth transfer rollers 231, 232, 233, and 234 of a transfer roller 230. Then, the electrode 10 transferred along the first to fourth transfer rollers 231, 232, 233, and 234 is continuously dried by heating members 220, which are respectively disposed between the first transfer roller 231 and the second transfer roller 232, between the second transfer roller 232 and the third transfer roller 233, and between the third transfer roller 233 and the fourth transfer roller 234, and the dried electrode is discharged through an outlet 213 of the heating body 210.

Here, each of the heating members 220 may directly heat and dry both surfaces of the electrode 10 through a plurality of heating lamps 222 to quickly remove moisture remaining on the electrode 10, and an exhaust member 240 may discharge air within the drying space 211 to the outside to increase in drying rate of the electrode 10.

Here, if there is a heating lamp, of which lifespan is ended, of the plurality of heating lamps 222, the plurality of heating lamps 222 may be taken out of the drying space 211 through a fixed plate 221a and a guide plate 221b of a mounting part 221 provided in the heating member 220. Thus, the heating lamp may be easily replaced.

In the collecting step (S30), the electrode 10 discharged through the outlet 213 of the heating body 210 is wound to be collected into the collecting unit 300.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A notching apparatus for a secondary battery, comprising:
    a notching unit configured to shape an electrode into a predetermined pattern;
    a heating unit configured to dry the electrode shaped by the notching unit; and
    a collecting unit configured to collect the electrode dried by the heating unit,
    wherein the heating unit comprises:
    a heating body having a drying space through which the electrode shaped by the notching unit passes; and
    heating members configured to directly heat a surface of the electrode passing through the drying space to dry moisture remaining on the electrode.

2. The notching apparatus of claim 1, wherein each of the heating members comprises:
    a mounting part provided in the drying space; and
    a plurality of heating lamps installed on the mounting part and disposed close to the surface of the electrode to directly heat the surface of the electrode so as to dry the moisture remaining on the electrode.

3. The notching apparatus of claim 2, wherein the mounting part comprises:
    a fixed plate provided in the drying space; and
    a guide plate which is slidably coupled to the fixed plate and on which the plurality of heating lamps are installed.

4. The notching apparatus of claim 3, wherein the heating body comprises:
    an inlet which is provided in a left surface of the heating body and through which the electrode supplied from the notching unit is introduced;
    an outlet which is provided in a right surface of the heating body and through which the electrode introduced into the drying space is discharged; and
    a cover coupled to one surface between the inlet and the outlet,
    wherein the guide plate is coupled to the fixed plate so as to be slid in a direction of the cover.

5. The notching apparatus of claim 4, wherein the heating unit further comprises a transfer roller configured to transfer the electrode introduced into the drying space,
    wherein the transfer roller comprises: a first transfer roller disposed at an inlet-side of the drying space; a second transfer roller disposed on an upper portion of a left surface of the drying space; a third transfer roller disposed on an upper portion of a right surface of the drying space; and a fourth transfer roller disposed at an outlet-side of the drying space,
    the heating members are respectively provided between the first transfer roller and the second transfer roller, between the second transfer roller and the third transfer roller, and between the third transfer roller and the fourth transfer roller, and
    the electrode introduced into the drying space is configured to be dried by the heating members while being transferred along the first to fourth transfer rollers.

6. The notching apparatus of claim 5, wherein the heating members are respectively provided to correspond to both a first and second surface of the electrode so as to dry both the first and second surfaces of the electrode at a same time.

7. The notching apparatus of claim 6, wherein the heating member drying the first surface of the electrode, which faces a wall of the drying space, is installed on the wall of the drying space, and the heating member drying the second surface of the electrode is installed on an auxiliary frame provided in the drying space.

8. The notching apparatus of claim 2, wherein a heating lamp, of the plurality of heating lamps, is spaced a distance of 2 mm to 10 mm from the surface of the electrode.

9. The notching apparatus of claim 1, wherein the heating unit further comprises an exhaust member configured to discharge air containing the moisture within the drying space to an outside of the drying space.

10. The notching apparatus of claim 9, wherein the exhaust member is disposed on an outer surface of the heating body.

11. The notching apparatus of claim 10, wherein the exhaust member comprises:

an exhaust duct disposed on the outer surface of the heating body to discharge the air within the drying space to the outside; and an exhaust pump configured to generate suction force to forcibly discharge the air within the drying space to the outside through the exhaust duct.

12. The notching apparatus of claim 2, wherein a heating lamp, of the plurality of heating lamps, comprises a far-infrared lamp.

13. The notching apparatus of claim 2, wherein a heating lamp, of the plurality of heating lamps, comprises a xenon light.

14. A notching method for a secondary battery, comprising:

shaping an electrode into a predetermined electrode pattern through a notching unit;

directly heating a surface of the electrode shaped through the notching unit by using a heating unit to dry moisture remaining on the electrode; and collecting the electrode dried in the heating unit into a collecting unit, wherein the heating unit comprises:

a heating body having a drying space through which the electrode shaped in the notching unit passes; and a heating member directly heating the surface of the electrode passing through the drying space to dry the moisture remaining on the electrode.

* * * * *